United States Patent [19]

Granzow

[11] 4,293,464

[45] Oct. 6, 1981

[54] PHOSPHINE OXIDE FLAME RETARDED, RUBBER-MODIFIED, POLYPHENYLENE ETHER RESIN COMPOSITIONS

[75] Inventor: Albrecht H. Granzow, Somerset, N.J.

[73] Assignee: American Cyanamid Company, Stamford, Conn.

[21] Appl. No.: 78,531

[22] Filed: Sep. 24, 1979

[51] Int. Cl.$^3$ ................................. C08K 5/51
[52] U.S. Cl. ................... 260/45.7 P; 260/45.85 R; 260/45.9 K; 260/45.9 NP; 260/45.95 P; 525/132
[58] Field of Search ............... 260/45.7 P, 45.85 R, 260/45.9 K, 45.95 P, 45.9 NP

[56] References Cited
U.S. PATENT DOCUMENTS

| | | | |
|---|---|---|---|
| 3,341,625 | 9/1967 | Gillham et al. | 260/45.7 P |
| 4,024,093 | 5/1977 | Abolins et al. | 260/17.4 SG |
| 4,061,681 | 12/1977 | Hillard et al. | 260/606.5 P |
| 4,101,504 | 7/1978 | Cooper et al. | 260/45.7 P |

*Primary Examiner*—Harold D. Anderson
*Attorney, Agent, or Firm*—Bruce F. Jacobs

[57] ABSTRACT

Flame retardant compositions are prepared from rubber-modified polyphenylene ether resins and a phosphine oxide of the formula

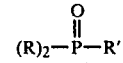

wherein R is alkyl, cycloalkyl, carboxyalkyl, phenyl, halophenyl, and alkoxyphenyl, and R' is hydrogen, alkyl, omega-cyanoalkyl, benzyl, alkylbenzyl and hydroxyalkyl.

6 Claims, No Drawings

PHOSPHINE OXIDE FLAME RETARDED, RUBBER-MODIFIED, POLYPHENYLENE ETHER RESIN COMPOSITIONS

The present invention relates to flame retardant polyphenylene ether resin compositions containing an effective flame retarding amount of a phosphine oxide compound represented by the formula:

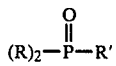

wherein R is selected from alkyl (1 to 4 carbon atoms, cycloalkyl (5 to 8 carbon atoms), phenyl, halophenyl (1 to 3 halogen atoms), alkoxyphenyl (1 to 4 carbon atom alkyl) carboxyalkyl (1 to 4 carbon atom alkyl); R' is selected from hydrogen, alkyl (1 to 12 carbon atoms), ω-cyano alkyl (1 to 4 carbon alkyl), benzyl, alkylbenzyl (1 to 5 alkyl substituents each having 1 to 4 carbon atoms), and hydroxyalkyl (1 to 4 carbon atom alkyl), with the proviso that when R is carboxyalkyl, R' is not hydrogen or benzyl.

More particularly, the invention relates to flame retardant polyphenylene ether resin blends with a polystyrene, containing a flame retardant amount of (1) methyl bis(2-carboxyethyl)phosphine oxide, (2) hydroxymethyl bis(cyclohexyl)phosphine oxide, or (3) benzyl bis(cyclohexyl)phosphine oxide.

The phosphine oxide compounds useful in the present invention are disclosed in one or more of Ger. Offenleg. No. 2,540,283; U.S. Pat. No. 4,061,681; U.S. Pat. No. 3,341,625; and J. Org. Chem. 24, 2013–2015 (1959). The compound alphahydroxy-methyl bis(cyclohexyl)phosphine oxide (Example 3) is believed to be a novel compound.

Flame retardant, rubber-modified, polyphenylene ether resin compositions are made by incorporating therein an effective flame retarding amount of a compound of the above formula.

The polyphenylene ether resin compositions, suitable for use in the present invention, are described in U.S. Pat. No. 4,024,093, incorporated herein by reference. Basically, these resins comprise about 10 to 90 parts by weight of polyphenylene ether and about 90 to 10 parts by weight of a styrene polymer. Preferably, the polymer contains about 50 to 80 parts by weight of polyphenylene ether and about 50 to 20 parts by weight of styrene polymer. The styrene polymer is a rubber-modified, high-impact polystyrene. The resins are blends of the two polymers, which are mutually soluble and form a homogeneous polymer composition.

The flame retardant compounds are used in an amount sufficient to provide a self-extinguishing composition, as described below. In general, however, the amount used is at least about 4% by weight, based on the weight of resin, preferably about 6% by weight.

The flame retardant compounds may be incorporated into the polymer by any method known in the art for doing so; however, it is preferable to incorporate the compounds by milling into the polymer on a conventional two-roll mill or by dry blending with the polymer, followed by extrusion.

It is also within the scope of the invention to incorporate such additional ingredients as plasticizers, dyes, pigments, heat and light stabilizers, antioxidants, antistatic agents, photochromic materials, and the like.

EXAMPLE 1

Methyl bis(2-carboxyethyl)phosphine oxide

Methyl bis(2-cyanoethyl)phosphine oxide was hydrolyzed in concentrated hydrochloric acid to give a white solid product, m.p. 174°–176° C. The neutralization equivalent (Theory 104) was: 1066; 1054; Av. 106.

EXAMPLE 2

2,4,6-Trimethylbenzyl bis(cyclohexyl)phosphine oxide

Prepared according to the procedure of Hillard et al., U.S. Pat. No. 4,061,681.

Dicyclohexyl phosphine (40.9 grams) in 50 ml of isopropanol was reacted with 15.8 grams of 38% formaldehyde solution at 40° C. When the reaction was completed (absence of P-H band in IR spectrum), 16.9 grams of 2,4,6-trimethylbenzyl chloride was added and the reaction mixture was heated for 22 hours at 55° C. A viscous oil was isolated from the reaction mixture, which crystallized on standing to give a white solid, m.p. 139°–143° C. Recrystallization from hexane gave a product with a m.p. 142°–145° C.

EXAMPLE 3

Alpha-hydroxymethyl bis(cyclohexyl)phosphine oxide

Dicyclohexyl hydroxymethyl phosphine was oxidized with 30% hydrogen peroxide in acetic acid and the product isolated as an oil which crystallized on standing. When recrystallized from benzene, a white solid was obtained, m.p. 154°–157° C.

EXAMPLE 4

Benzyl bis(cyclohexyl)phosphine oxide

A mixture of 6.85 grams of dicyclohexyl methyl phosphinite and 4.0 grams of benzyl chloride was heated under nitrogen at 160° C. for 2 hours. The crystalline product was re-crystallized from heptane to give 5.4 grams of white solid, m.p. 147°–149° C.

EXAMPLE 5

2-Cyanoethyl bis(n-propyl)phosphine oxide

To dipropyl cyanoethyl phosphine (6.88 grams, 0.04 mole) in 25 ml glacial acetic acid was added 5.67 grams (0.05 mole) of 30% hydrogen peroxide at 60° C. The reaction mixture was heated for 30 minutes at 75° C. to give 7.5 grams of product.

EXAMPLE 6

Diphenyl phosphine oxide

Diphenyl phosphorous chloride was hydrolyzed according to the prodcedure of J. Org. Chem. 24, 2013 (1959) to give the subject compound.

EXAMPLE 7

A total of 10 grams of a blend of 50 parts of polyphenylene ether/50 parts of rubber-modified impact polystyrene, containing 6% by weight of the compounds shown below, was extruded through a Melt Index Apparatus (described in ASTM D-1238) at 290°–300° C. The cylindrical extrudate, 3–5 inches long and 0.25 inch in diameter, was subjected to the following flammability test, described in Underwriters Laboratories Test UL-94, Vertical Test, Method 3.10-3.15 (Sept. 1973): The polymer specimen, clamped in a vertical position is ignited with a ¾" blue flame (methane or natural gas) for 10 seconds, and the flame is withdrawn. If the flame is extinguished within 25 seconds, the sample is reignited for 10 seconds and the flame again withdrawn. The flame extinguishment time is again recorded. If the flame extinguishment time does not exceed 5 seconds for either flame application, the sample is rated V-O; if the flame extinguishment time for either the first or second flame application is between 5 and 25 seconds, the sample is rated V-1. If a sample shows extinguishment times exceeding 25 seconds for either flame application, it is rated freeburning (FB) and is considered to have failed the test.

The following compounds are rated either V-O or V-1, according to the test, when incorporated into the resin at 6% by weight.

| | R | R' |
|---|---|---|
| 1. | —CH₂CH₂CO₂H | —CH₃ |
| 2. | ⟨S⟩— | —CH₂—C₆H₂(CH₃)₃ |
| 3. | ⟨S⟩— | —CH₂OH |
| 4. | ⟨S⟩— | —CH₂—⟨phenyl⟩ |
| 5. | n-C₃H₇— | —CH₂CH₂CN |
| 6. | ⟨phenyl⟩— | —H |
| 7. | ⟨S⟩— | —H |
| 8. | Cl—⟨phenyl⟩— | —H |
| 9. | CH₃O—⟨phenyl⟩— | —H |
| 10. | n-C₃H₇ | n-C₈H₁₇ |
| 11. | —CH₂CH₂CO₂H | n-C₇H₁₅ |

EXAMPLE 8

The procedure of Example 7 is repeated except that the blend contains 70 parts of polyphenylene ether resin and 30 parts of polystyrene. When tested at a concentration of 4% by weight, the compounds are rated either V-O or V-1, according to the test.

EXAMPLE 9

Following the procedure of Example 7, a determination was made of the flammability rating of a high-impact polystyrene containing 20% by weight of the compounds identified therein. When determined according to the UL-94 procedure, the specimens were free-burning (FB).

The examples illustrate that (1) for a 50/50 blend of polyphenylene ether resin, the compounds must be used at a concentration of at least 6% by weight to be effective flame retardants; (2) for a 70/30 blend, at least 4% by weight of the compound is required; and (3) the compounds are not effective flame retardants for polystyrene even at a concentration of 20% by weight.

What is claimed is

1. A flame retardant composition comprising a homogeneous blend of polymers containing about 50 to 80 parts by weight of polyphenylene ether resin, about 50 to 20 parts by weight of a polystyrene, and 6% by weight down to a flame retarding effective amount of a compound represented by the formula:

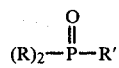

wherein R is selected the group consisting of from alkyl (1 to 4 carbon atoms), cycloalkyl (5 to 8 carbon atoms), carboxyalkyl (1 to 4 carbon atoms), phenyl, halophenyl (1 to 3 halogen atoms), alkoxyphenyl (1 to 4 carbon alkoxy); R' is selected the group consisting of from hydrogen, alkyl (1 to 12 carbon atoms), omega-cyano alkyl (1 to 4 carbon alkyl), benzyl, alkylbenzyl (1 to 5 alkyl substituents each containing 1 to 4 carbon atoms), and hydroxyalkyl (1 to 4 carbon alkyl), with the proviso that when R is carboxyalkyl, R' is not hydrogen or benzyl.

2. The composition of claim 1 wherein R is cyclohexyl and R' is benzyl.

3. The composition of claim 1 wherein R is carboxyethyl and R' is methyl.

4. The composition of claim 1 wherein R is cyclohexyl and R' is hydroxymethyl.

5. The composition of claim 1 wherein the blend is about 70 parts polyphenylene ether and about 30 parts polystyrene, and the phosphine oxide is incorporated in an amount of at least 4% by weight based upon the blend of polymers.

6. The composition of claim 1 wherein the blend is about 50 parts polyphenylene ether and about 50 parts polystyrene, and the phosphine oxide is incorporated in an amount of 6% by weight based upon the blend of polymers.

* * * * *